United States Patent
Sahinoglu et al.

(10) Patent No.: US 8,014,326 B2
(45) Date of Patent: Sep. 6, 2011

(54) JOINT CARRIER ALLOCATION AND TIME SHARING FOR OFDMA/TDMA NETWORKS

(75) Inventors: Zafer Sahinoglu, Arlington, MA (US); Yi Huang, Riverside, CA (US); Qinghe Du, College Station, TX (US); Zhifeng Tao, Allston, MA (US); Ghulam Bhatti, Mansfield, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 458 days.

(21) Appl. No.: 12/359,470

(22) Filed: Jan. 26, 2009

(65) Prior Publication Data
US 2010/0189069 A1   Jul. 29, 2010

(51) Int. Cl.
H04B 7/185 (2006.01)
H04B 7/24 (2006.01)
H04B 7/00 (2006.01)
H04W 4/00 (2009.01)
H04J 3/24 (2006.01)

(52) U.S. Cl. ........ 370/310; 370/318; 370/328; 370/338; 370/349; 455/39; 455/522

(58) Field of Classification Search .................. 370/328, 370/310, 318, 338, 349; 455/39, 522
See application file for complete search history.

(56) References Cited

U.S. PATENT DOCUMENTS

| | | |
|---|---|---|
| 4,679,227 A | 7/1987 | Hughes-Hartogs |
| 4,731,816 A | 3/1988 | Hughes-Hartogs |
| 4,833,706 A | 5/1989 | Hughes-Hartogs |

OTHER PUBLICATIONS

Bingham et al., "Multi-carrier modulation for data transmission: An idea whose time has come," IEEE Commun. Mag., vol. 28, No. 5, pp. 5-14, May 1990.
Linnartz et al., "Multi-carrier CDMA in indoor wireless radio networks," Proc. IEEE PIMRC, Sep. 1993, pp. 109-113.
Hara et al., "Overview of multi-carrier CDMA," IEEE Commun. Mag., vol. 35, No. 12, pp. 126-133, Dec. 1997.
Tse et al., "Multiaccess fading channels—Part I: Polymatroid structure, optimal resource allocation and throughput capacities," IEEE Trans. Inf. Theory, vol. 44, No. 7, pp. 2796-2815, Nov. 1998.
P. S. Chow, J. M. Cioffi, and J. A. C. Bingham, "A practical discrete multitone transceiver loading algorithm for data transmission over spectrally shaped channels," IEEE Trans. Commun., vol. 43, No. 2/3/4, pp. 773-775, Feb./Mar./Apr. 1995.
Kalet, "The multitone channel," IEEE Trans. Commun., vol. 37, No. 2, pp. 119-124, Feb. 1989.
T. J. Willink and P. H. Wittke, "Optimization and performance evaluation of multi-carrier transmission," IEEE Trans. Inf. Theory, vol. 43, No. 2, pp. 426-440, Mar. 1997.

(Continued)

*Primary Examiner* — Kwang B Yao
*Assistant Examiner* — Adam Duda
(74) *Attorney, Agent, or Firm* — Dirk Brinkman; Gene Vinokur

(57) ABSTRACT

A method and system provide multiple-access control and frequency band allocation, and transmission time sharing among multiple users in orthogonal frequency-division multiple-access (OFDMA) and time-division multiple-access (TDMA) networks. The method can be applied to uplinks and downlinks of multi-user, multi-carrier communication networks. Under a total transmission-power minimization constraint, the method can allocate carriers and transmission time to users optimally, and at the same time, can guarantee a data rate or equivalently a latency requirement of each user.

10 Claims, 9 Drawing Sheets

OTHER PUBLICATIONS

J. Jang, K. B. Lee, and Y.-H. Lee, "Frequency-time domain transmit power adaptation for a multi-carrier network in fading channels," Electron. Lett., vol. 38, No. 5, pp. 218-220, Feb. 2002.

B. Krongold, K. Ramchandran, and D. Jones, "Computationally efficient optimal power allocation algorithms for multi-carrier communication networks," IEEE Trans. Commun., vol. 48, No. 1, pp. 23-27, Jan. 2000.

Leke and J. M. Cioffi, "A maximum rate loading algorithm for discrete multitone modulation networks," in Proc. IEEE GLOBECOM, pp. 1514-1518, Nov. 1997.

R. F. H. Fischer and J. B. Huber, "A new loading algorithm for discrete multitone transmission," in Proc. IEEE GLOBECOM, London, U.K., pp. 724-728, Nov. 1996.

R. S. Cheng and S. Verdú, "Gaussian multiaccess channels with ISI: Capacity region and multi-user water-filling," IEEE Trans. Inf. Theory, vol. 39, No. 3, pp. 773-785, May 1993.

C. Y. Wong, R. S. Cheng, K. B. Letaief, and R. D. Murch, "Multi-user OFDM with adaptive subcarrier, bit and power allocation," IEEE J. Sel. Areas Commun., vol. 17, No. 10, pp. 1747-1758, Oct. 1999.

D. Kivanc, G. Li, and H. Liu, "Computationally efficient bandwidth allocation and power control for OFDMA," IEEE Trans. Wireless Commun., vol. 2, No. 6, pp. 1150-1158, Nov. 2003.

S. Pietzyk and G. J. M. Janssen, "Multi-user subcarrier allocation for QoS provision in the OFDMA networks," in Proc. IEEE VTC—Fall, Sep. 2002, vol. 2, pp. 1077-1081.

S. Pfletschinger, G. Munz, and J. Speidel, "Efficient subcarrier allocation for multiple access in OFDM networks," in Proc. 7th Int. OFDM Workshop, pp. 21-25, Sep. 2002.

H. Yin and H. Liu, "An efficient multi-user loading algorithm for OFDM-based broadband wireless networks," in Proc. IEEE Globecom, 2000, pp. 103-107.

W. Rhee and J. M. Cioffi, "Increase in capacity of multi-user OFDM network using dynamic subchannel allocation," in Proc. IEEE VTC, pp. 1085-1089, 2000.

M. Ergen, S. Coleri, and P. Varaiya, "QoS aware adaptive resource allocation techniques for fair scheduling in OFDMA based broadband wireless access networks," IEEE Trans. Broadcast., vol. 49, No. 4, pp. 362-370, Dec. 2003.

J. Jang, K. B. Lee, and Y. H. Lee, "Transmit power and bit allocations for OFDM networks in fading channel," in Proc. IEEE Globecom, pp. 858-862, Dec. 2003.

S. Pfletschinger, G. Munz, and J. Speidel, "An efficient water-filling algorithm for multiple access OFDMA," in Proc. IEEE Globecom, Taipei, Taiwan, pp. 681-685, Nov. 2002.

Z. Shen, J. G. Andrews, and B. L. Evans, "Optimal power allocation in multi-user OFDM networks," in Proc. IEEE Global Commun. Conf., pp. 337-341, 2003.

400

500

700

US 8,014,326 B2

JOINT CARRIER ALLOCATION AND TIME SHARING FOR OFDMA/TDMA NETWORKS

FIELD OF INVENTION

The invention relates in generally to of multiple access control (MAC) of communications networks, and in particular to carrier allocation and transmission time sharing among multiple transceiver in wireless communications networks.

BACKGROUND OF THE INVENTION

Multi-carrier modulation supports wideband wireless communication with a guaranteed quality of service (QoS). Instead of employing a very complicated adaptive equalizer to reduce intersymbol interference (ISI), multi-carrier modulation satisfies a stringent service requirement by partitioning a single wideband channel into many subchannels that are free of ISI, Bingham et al., "Multi-carrier modulation for data transmission: An idea whose time has come," IEEE Commun. Mag., vol. 28, no. 5, pp. 5-14, May 1990, Linnartz et al., "Multi-carrier CDMA in indoor wireless radio networks," Proc. IEEE PIMRC, September 1993, pp. 109-113, and Hara et al., "Overview of multi-carrier CDMA," IEEE Commun. Mag., vol. 35, no. 12, pp. 126-133, December 1997.

Although multi-carrier modulation simplifies the design of equalizers, it causes a set of resource allocation problems. To achieve efficient utilization of scarce radio resources such as bandwidth, power, and transmission time, an optimal resource allocation strategy is desired.

It is well known that a water-filling power allocation is an optimal solution to achieve the capacity of a set of parallel channels. Throughput capacity and optimal resource allocation are described by Tse et al., "Multiaccess fading channels—Part I: Polymatroid structure, optimal resource allocation and throughput capacities," IEEE Trans. Inf. Theory, vol. 44, no. 7, pp. 2796-2815, November 1998.

In single-user multi-carrier networks, one well-known water-filling method is the Hughes-Hartogs algorithm, see. Hughes-Hartogs, "Ensemble modem structure for imperfect transmission media," U.S. Pat. No. 4,679,227, Jul. 7, 1987, Hughes-Hartogs, "Ensemble modem structure for imperfect transmission media," U.S. Pat. No. 4,731,816, Mar. 15, 1988, and Hughes-Hartogs, "Ensemble modem structure for imperfect transmission media," U.S. Pat. No. 4,833,706, May 30, 1989.

A number of efficient resource allocation methods are known, aee P. S. Chow, J. M. Cioffi, and J. A. C. Bingham, "A practical discrete multitone transceiver loading algorithm for data transmission over spectrally shaped channels," IEEE Trans. Commun., vol. 43, no. 2/3/4, pp. 773-775, February/March/April 1995; I. Kalet, "The multitone channel," IEEE Trans. Commun., vol. 37, no. 2, pp. 119-124, February 1989; T. J. Willink and P. H. Wittke, "Optimization and performance evaluation of multi-carrier transmission," IEEE Trans. Inf. Theory, vol. 43, no. 2, pp. 426-440, March 1997; J. Jang, K. B. Lee, and Y.-H. Lee, "Frequency-time domain transmit power adaptation for a multi-carrier network in fading channels," Electron. Lett., vol. 38, no. 5, pp. 218-220, February 2002; B. Krongold, K. Ramchandran, and D. Jones, "Computationally efficient optimal power allocation algorithms for multi-carrier communication networks," IEEE Trans. Commun., vol. 48, no. 1, pp. 23-27, January 2000; and A. Keke and J. M. Cioffi, "A maximum rate loading algorithm for discrete multitone modulation networks," in Proc. IEEE GLOBECOM, pp. 1514-1518, November 1997; R. F. H. Fischer and J. B. Huber, "A new loading algorithm for discrete multitone transmission," in Proc. IEEE GLOBECOM, London, U.K., pp. 724-728, November 1996.

The single-user water-filling algorithm can be extended to a multi-user waterfilling algorithm described by R. S. Cheng and S. Verdú, "Gaussian multiaccess channels with ISI: Capacity region and multi-user water-filling," IEEE Trans. Inf. Theory, vol. 39, no. 3, pp. 773-785, May 1993. However, that algorithm does not take into account practical issues such as the QoS requirements for individual users.

When considering realistic constraints for multi-user, multi-carrier network, the existing resource allocation algorithms can be categorized into two classes based on the optimization criteria: minimizing power given a QoS constraint, and maximizing throughput given power constraint.

The first class considers the problem of minimization of the overall transmission power given the constraint of QoS requirements of individual users, see C. Y. Wong, R. S. Cheng, K. B. Letaief, and R. D. Murch, "Multi-user OFDM with adaptive subcarrier, bit and power allocation," IEEE J. Sel. Areas Commun., vol. 17, no. 10, pp. 1747-1758, October 1999; D. Kivanc, G. Li, and H. Liu, "Computationally efficient bandwidth allocation and power control for OFDMA," IEEE Trans. Wireless Commun., vol. 2, no. 6, pp. 1150-1158, November 2003; S. Pietzyk and G. J. M. Janssen, "Multi-user subcarrier allocation for QoS provision in the OFDMA networks," in Proc. IEEE VTC—Fall, September 2002, vol. 2, pp. 1077-1081; S. Pfletschinger, G. Munz, and J. Speidel, "Efficient subcarrier allocation for multiple access in OFDM networks," in Proc. 7th Int. OFDM Workshop, pp. 21-25, September 2002; H. Yin and H. Liu, "An efficient multi-user loading algorithm for OFDM-based broadband wireless networks," in Proc. IEEE Globecom, 2000, pp. 103-107.

The second class attempts to maximize the overall throughput under the constraint of the transmission-power budget. See W. Rhee and J. M. Cioffi, "Increase in capacity of multi-user OFDM network using dynamic subchannel allocation," in Proc. IEEE VTC, pp. 1085-1089, 2000; M. Ergen, S. Coleri, and P. Varaiya, "QoS aware adaptive resource allocation techniques for fair scheduling in OFDMA based broadband wireless access networks," IEEE Trans. Broadcast., vol. 49, no. 4, pp. 362-370, December 2003; J. Jang, K. B. Lee, and Y. H. Lee, "Transmit power and bit allocations for OFDM networks in fading channel," in Proc. IEEE Globecom, pp. 858-862, December 2003; S. Pfletschinger, G. Munz, and J. Speidel, "An efficient water-filling algorithm for multiple access OFDMA," in Proc. IEEE Globecom, Taipei, Taiwan, pp. 681-685, November 2002; Z. Shen, J. G. Andrews, and B. L. Evans, "Optimal power allocation in multi-user OFDM networks," in Proc. IEEE Global Commun. Conf., pp. 337-341, 2003.

However, all the known methods restrict channel allocations to be exclusive in the time domain for individual users, i.e., two users cannot time share one channel. In other words, the resource allocation is only one dimension. The prior art only considers allocating the channels, while omitting the transmission time. The transmission time is also a scarce resource in wireless communication, and should also be allocated efficiently to multiple users.

SUMMARY OF THE INVENTION

The embodiments of the invention provide a method for multiple-access control (MAC) and carrier (frequency band) allocation and transmission time sharing among multiple users in orthogonal frequency-division multiple-access (OFDMA) and time-division multiple-access (TDMA) networks. The method combines the essence of OFDMA and TDMA. OFDMA/TDMA can be applied to the uplink and downlink of multi-user, multi-carrier communication networks.

Under a total transmission-power minimization constraint, the method can allocate carriers and transmission time to users optimally, and at the same time, can guarantee a data rate or equivalently a latency requirement of each user. The design of the transmitter and the receiver with OFDMA/TDMA according to the invention is also described.

DETAILED DESCRIPTION OF THE PREFERRED EMBODIMENTS

Figure 1A:
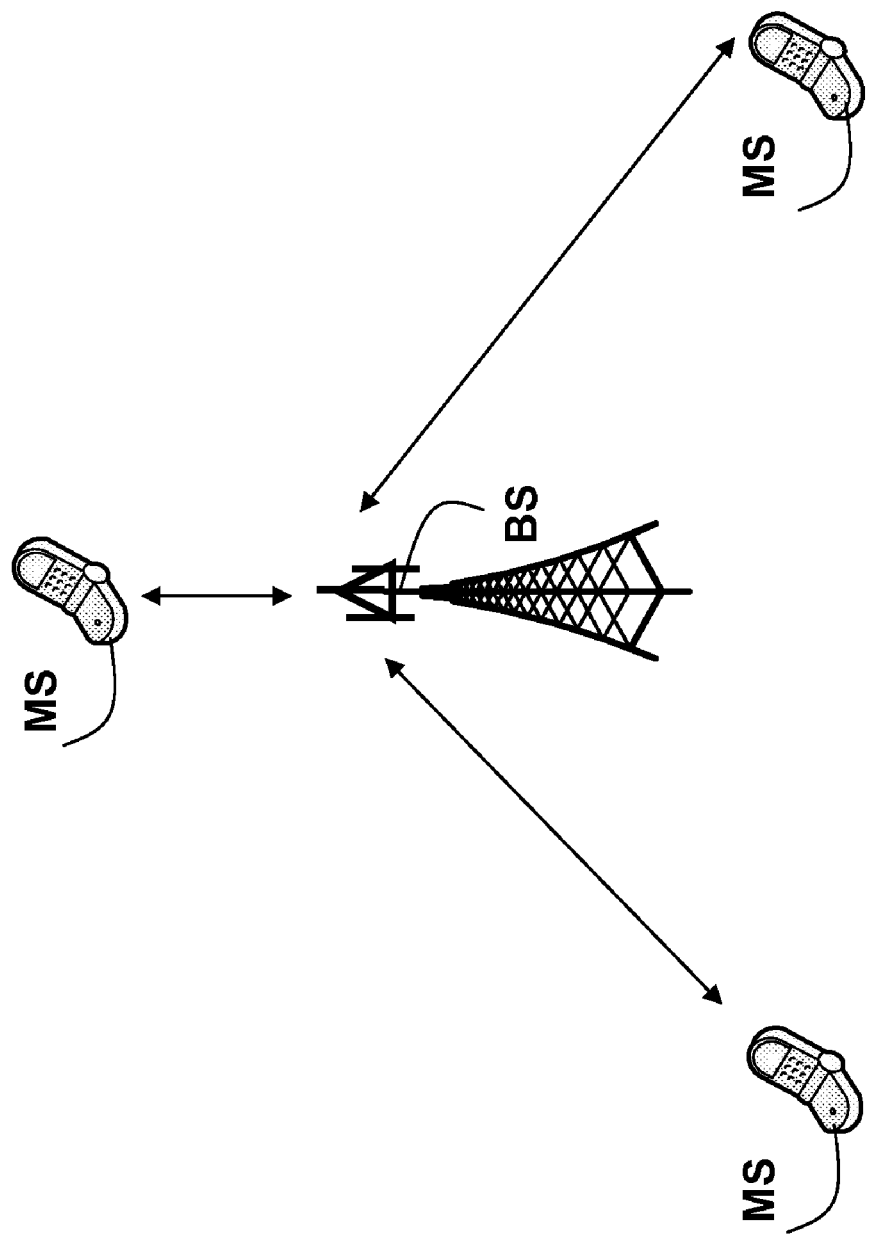
FIG. 1A is a schematic of a network according to embodiments of the invention.

As shown in FIG. 1A, a multi-user, multi-carrier network according to embodiments of our invention includes a central controller or base station (BS) and K distributed users (mobile stations MS). The central controller can be the base station (BS) in a wireless cellular network where the users are mobile stations (telephones). The central controller and each of the K mobile station include a transmitter and a receiver (transceiver). In general, "users" as referred to herein can be user equipment (UE) such as cell phones, transceivers, computers, stations, terminals, and generally nodes.

In wireless personal, local and metropolitan (PAN/LAN/MAN) networks, the central controller can be an access point (AP), and the K users can be a set of client nodes accessing a backbone network via the AP. In the area of industrial automatic control, the central controller can be a master node that communicates with K slave nodes.

A method according to embodiments of our invention combines orthogonal frequency-division multiple-access (OFDMA) with time-division multiple-access (TDMA). The method uses an OFDMA/TDMA media access control (MAC) protocol that provides the multi-user, multi-carrier communication network with low transmission power at a pre-specified data rate threshold (or equivalently latency threshold) by dynamically allocating OFDMA/TDMA channels to users based on their spatial/location dependent wireless channel status.

OFDMA with Channel Allocation

According to embodiments of the invention, N orthogonal carriers (frequency bands) enable multiple users to transmit signals concurrently. Specifically, because different carriers experience independent channel fading, the $k^{th}$ user is allocated a set of carriers where the $n^{th}$ carrier has a channel gain $\alpha_{k,n}$. Furthermore, because users are typically at different locations, even for the same carrier n, the channel gains experienced at different users are different and independent. In other words, the channel gains $\alpha_{1,n}, \alpha_{2,n}, \ldots, \alpha_{K,n}$, have independent fading statistics. The channel gain $\alpha_{k,n}$, which is the $n^{th}$ carrier at the $k^{th}$ user, has independent statistics both over k and n, which offers a two-dimensional (k and n) freedom to improve the network performance.

Consider a single carrier network. According to Shannon's law, the achievable reliable data rate c in bits/symbol is $$c = \log_2(1 + SNR) = \log_2\left(1 + \frac{P\alpha^2}{\sigma^2}\right), \quad (1)$$

where P is the transmission power, $\alpha$ is the channel gain/decay factor of the single carrier, $\sigma^2$ is the power of additive white Gaussian noise (AWGN), $$\frac{P\alpha^2}{\sigma^2}$$

is the signal-to-noise ratio (SNR) at the receiver. Equivalently, we can express the transmission power as $$P = \frac{(2^c - 1)\sigma^2}{\alpha^2}. \quad (2)$$

Now, we consider a multi-user, multi-carrier network with K users and N carriers. In such networks that use OFDMA technology, different carriers are allocated to different users so that multiple users can access the network concurrently without interfering with each other, because those carriers are orthogonal in the frequency domain. However, OFDMA causes a carrier allocation problem. Generally, different carrier allocations generate different network performance. Thus, achieving optimal resource allocation is important.

Specifically, the $n^{th}$ carrier is allocated to the $k^{th}$ user, and the associated channel gain is $\alpha_{k,n}$. The desired data rate is c bits/symbol for user k, similar to Equation (2). The power needed to transmit data for user k over the carrier n is $$P_{k,n} = \frac{(2^c - 1)\sigma^2}{\alpha_{k,n}^2}. \quad (3)$$

From Equation (2), given a certain data rate of c for user k, the transmission power is determined according to the carrier n. If a different carrier is allocated, out of totally N carriers for user k, a different power is needed to guarantee the same data rate c. Therefore, an optimal carrier allocation is needed for OFDMA.

OFDMA/TDMA

However, the above channel allocation with OFDMA restricts the channel allocation to be exclusive in the time domain for individual users, i.e., two users cannot share one carrier (channel) at the same time. In other words, their resource allocation is only one dimension. That is, the allocation only considers allocating the channels, and omits the transmission time, which is also a scarce resource in wireless communication.

Figure 1B:
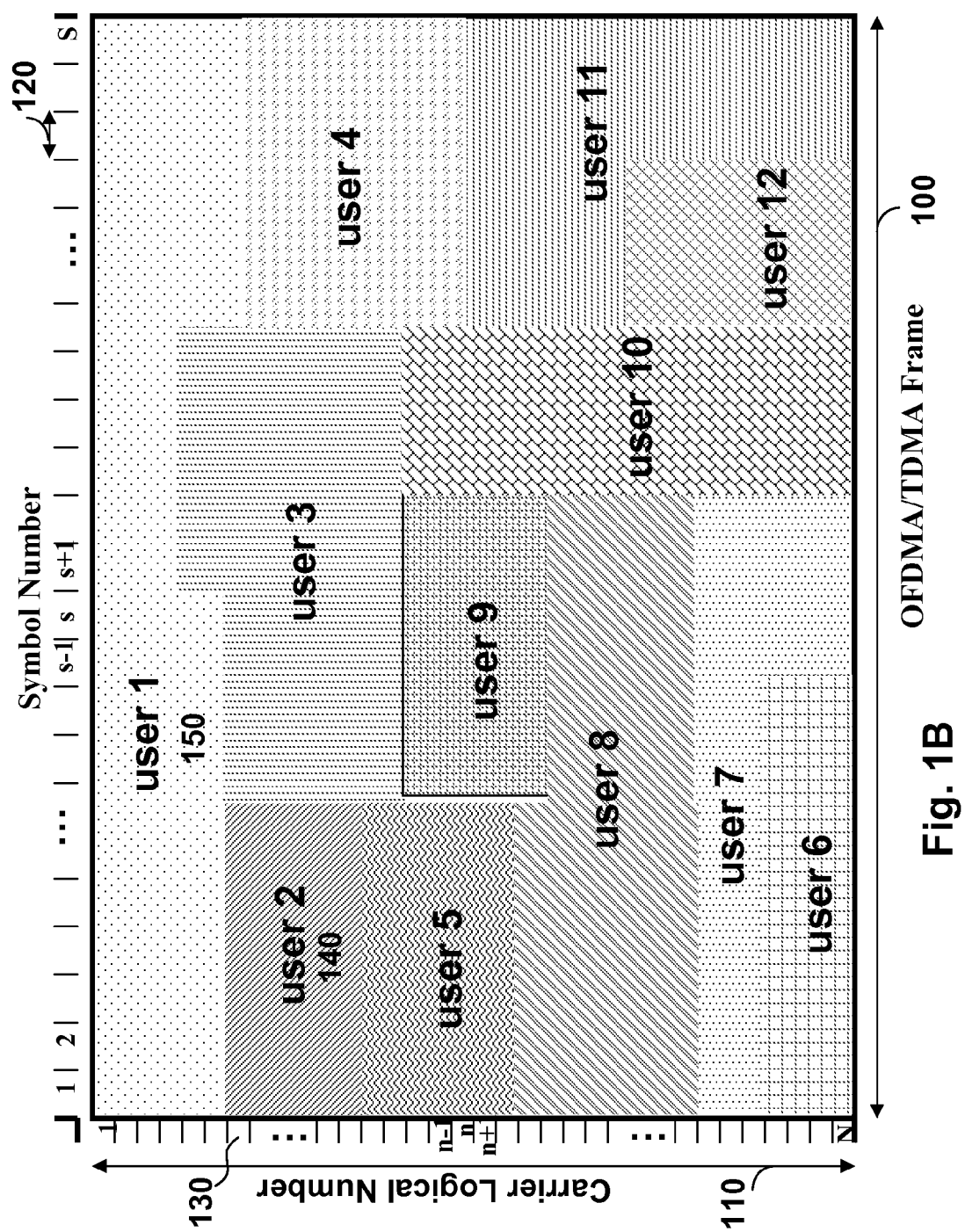
FIG. 1B is a block diagram of an OFDMA/TDMA frame for multiple users to access a wireless media concurrently according to embodiments of the invention.
Figure 2:
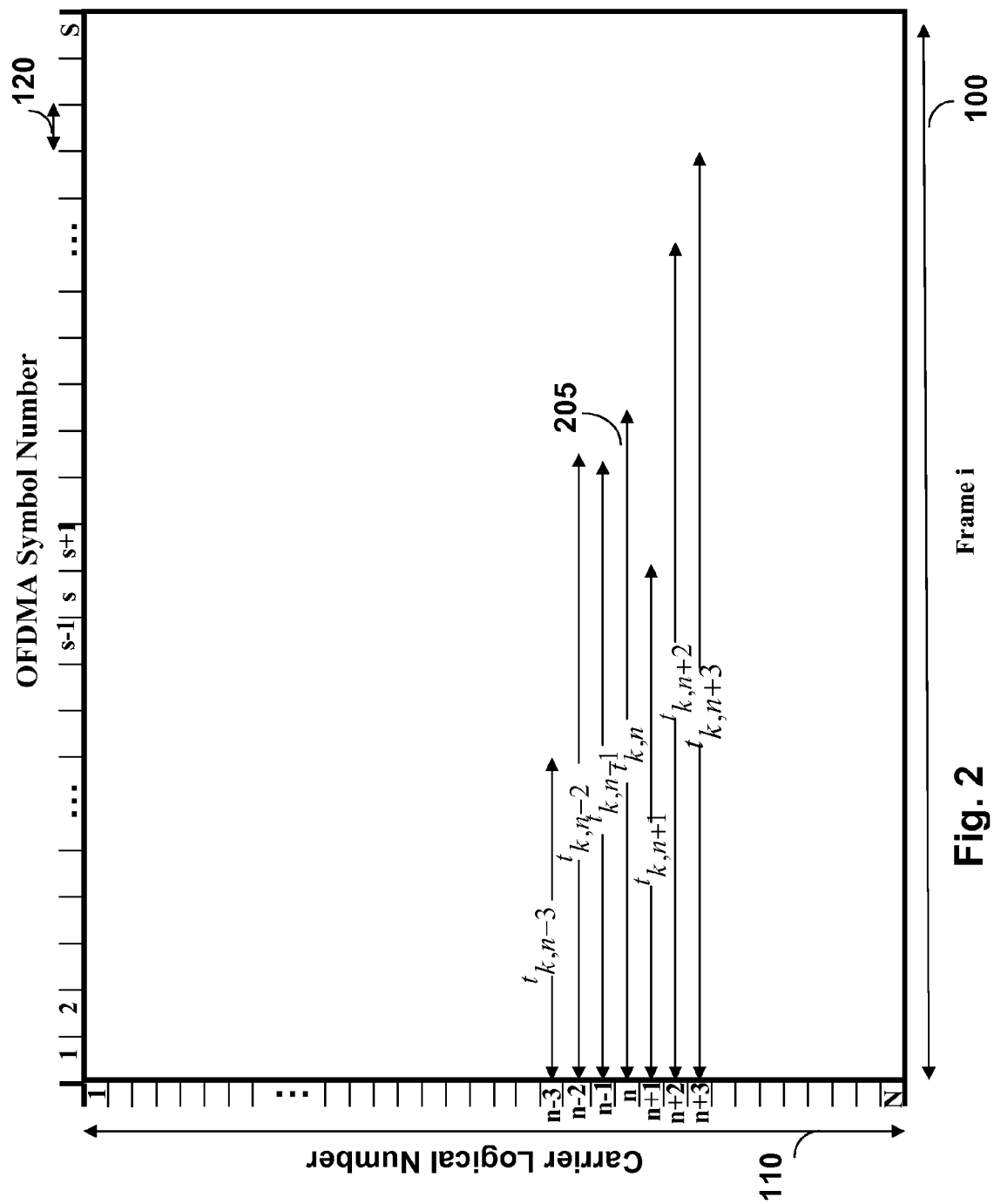
FIG. 2 is a schematic for carrier and transmission time allocation according to embodiments of the invention.

As shown in FIGS. 1B and 2, the invention enables multiple users to share one carrier in the time domain. In FIG. 1B, the vertical and horizontal axes respectively represent frequency and time.

More specifically, we partition the transmission time of one frame into multiple symbol durations 120 as shown in FIG. 1, and allow one user 140 to occupy a particular carrier 130 for one or several symbol durations, i.e., we partition the transmission time interval of the nth code channel into K time intervals as $t_{1,n}, t_{2,n}, \ldots, t_{k,n}, \ldots, t_{K,n}$, where $t_{k,n}$ 205 is the time interval of the $n^{th}$ code channel taken by the $k^{th}$ user, which can be any number of symbol durations up to the whole frame duration, see FIG. 2.

A resource block (RB) is defined as a set of contiguous frequency bands and symbols. In the prior art, resource blocks are always rectangular in the 2D frequency and time domains, see user 1 (MS) 140. However, according to the embodiments, the RB can have an arbitrary shape, see user 2 150. This is one basic idea of our novel MAC scheme. We combine OFDMA and TDMA to provide an OFDMA/TDMA scheme.

FIG. 1B shows one data frame transmitted within a multi-user, multi-carrier communications network with twelve users, showing the OFDMA/TDMA scheme according to the invention. The x-axis 100 denotes time domain at symbol interval resolutions 120. The y-axis 110 shows the carrier logical channel indices n. The OFDMA/TDMA schedules multi-user transmissions within the time-carrier 2-dimensional domain. The carriers and transmission times or symbol durations are allocated to multiple users without overlapping so that multiple users can access the wireless media without mutual interference to each other.

Figure 1C:
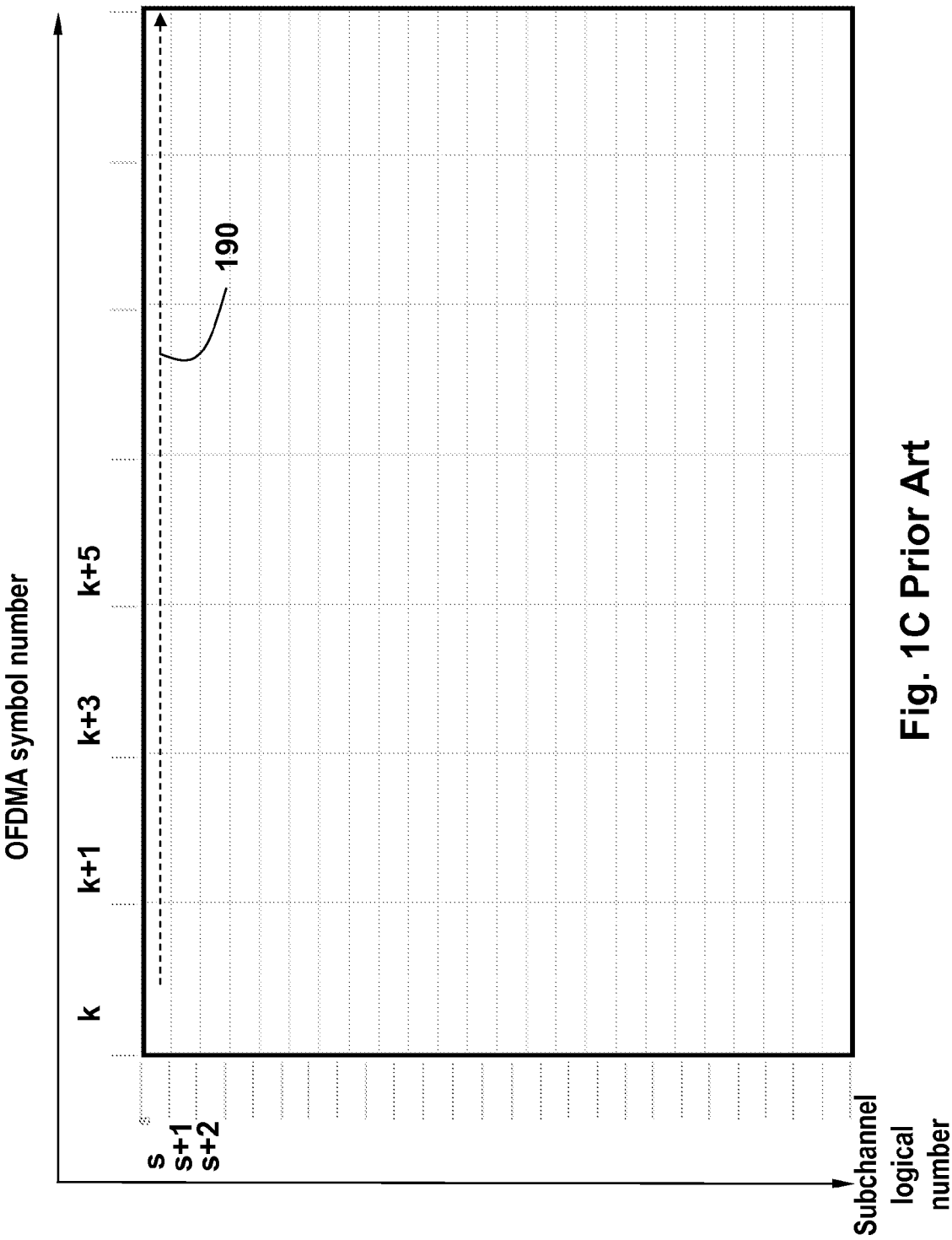
FIG. 1C is a block diagram of a prior art OFDMA frame.

For comparison, FIG. 1C shows a prior art unlink frame according to the Worldwide Interoperability for Microwave Access (WiMAX) IEEE 802.16 standard. The frame has symbols k in the time domain, and channels s in the frequency domain.

For resource allocation, the user always starts from the first symbol of the first available logical subchannel, scans 190 through the time domain (symbols) until either all data are transmitted, or the last symbol in the frame is reached for the first channel. In the latter case, the user moves to the next subchannel, and start from the first symbol again.

OFDMA/TDMA with Joint Optimal Channel Allocation and Time Sharing

In the case that communication applications are delay sensitive, the total transmission power is minimized, while guaranteeing the data-rate requirement for each user, which is equivalent to guarantee the latency of each user. In our invention, we consider a multi-user, multi-carrier network with K users and N orthogonal carriers.

Figure 3:
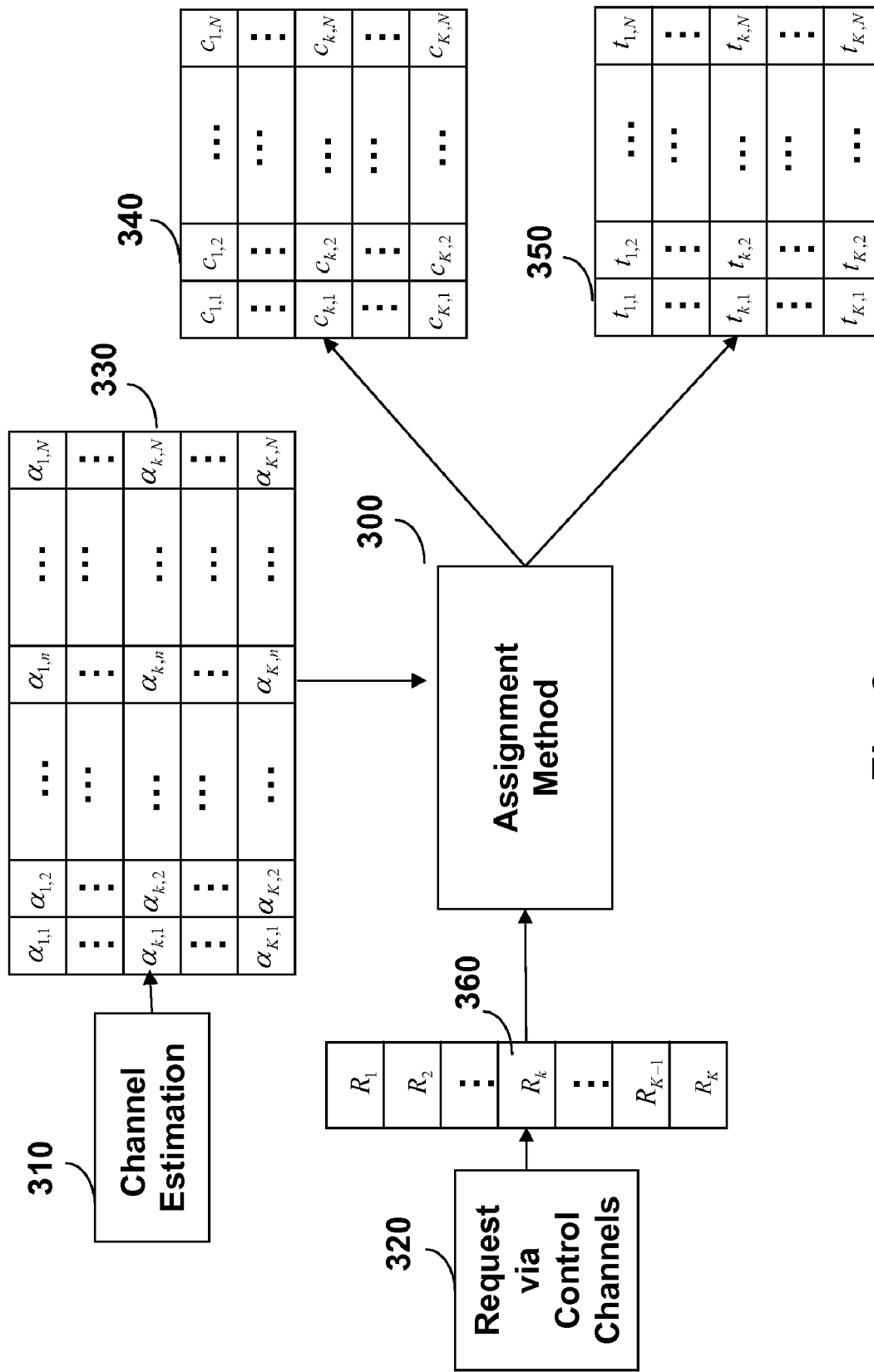
FIG. 3 is a block diagram for carrier allocation and transmission time sharing for multiple users according to embodiments of the invention.

As shown in FIG. 3, the $k^{th}$ user requires a data rate of $R_k$ 360 in bits/sec from the master controller via the control channel 320. The master performs channel estimation 310. With the channel state information, the master generates a channel coefficient matrix 330. Without loss of generality, the duration of one frame is normalized into one second, and the time interval $t_{k,n}$ 205 then becomes a real value in the range of [0, 1] second.

As shown in FIG. 3, during the time interval $t_{k,n}$ 205, the allocation method 300 allocates carriers to users based on the required data rate 360 and channel gains 330. Assume that carrier n is allocated to user k. To achieve a reliable data rate $c_{k,n}$ 340, in bits/symbol for user k over carrier n in the interval $t_{k,n}$ 350, the power consumed for this data transmission (time-scaled by $t_{k,n}$) is $$P_{k,n} = t_{k,n} \frac{(2^{c_{k,n}} - 1)\sigma^2}{\alpha_{k,n}^2}. \tag{4}$$

In FIG. 2, different patterns are used to distinguish different achievable rates and consumed transmission power within different allocated carrier-time regions to user k. It is straightforward to see that the total transmission power is a summation over all users and the whole frame, which is $$P = \sum_{k=1}^{K} \sum_{n=1}^{N} P_{k,n} = \sum_{k=1}^{K} \sum_{n=1}^{N} t_{k,n} \frac{(2^{c_{k,n}} - 1)\sigma^2}{\alpha_{k,n}^2}. \tag{5}$$

In our invention, we consider how to guarantee the data rate $R_k$ 360 bits/sec to user k. User k accesses the network by transmitting on carrier n for time interval $t_{k,n}$ 205 with rate $c_{k,n}$ 330. The bandwidth of each carrier is B Hz. Then, the number of bits transmitted over carrier n, in the frame duration (normalized into one second), is B $t_{k,n}c_{k,n}$ Summing over all possible carriers, we ensure that the following condition holds, $$\sum_{n=1}^{N} Bt_{k,n}c_{k,n} \geq R_k, k = 1, 2, \ldots, K. \tag{6}$$

If the frame duration 100 is normalized to one second, we an extra constraint on $t_{k,n}$ 205, which is $$\sum_{k=1}^{K} t_{k,n} = 1, n = 1, 2, \ldots, N. \tag{7}$$

Therefore, our problem is to find the optimal values of $t_{k,n}$ 205 and $c_{k,n}$ 340 for all k and n to guarantee the data-rate requirements of all the users, while minimizing the total transmission power P. We can formulate this problem as follows:

$$P = \min \sum_{k=1}^{K} \sum_{n=1}^{N} t_{k,n} \frac{(2^{c_{k,n}} - 1)\sigma^2}{\alpha_{k,n}^2}, \tag{8}$$

subject to $$\sum_{n=1}^{N} Bt_{k,n}c_{k,n} \geq R_k, k = 1, 2, \ldots, K,$$

where $$\sum_{k=1}^{K} t_{k,n} = 1, n = 1, 2, \ldots, N, t_{k,n} \geq 0$$

for all k and n, and $c_{k,n} \geq 0$ for all k and n.

Solution to the Optimal Channel Allocation and Time Sharing Problem

The formulated problem in Equation (8) is not a convex optimization problem. Hence, the search of its optimal solution is NP (non-polynomial) hard. Fortunately, the problem can be converted into a convex optimization problem, which can be solved efficiently by a conventional interior point process.

The interior point process, also referred to as the barrier method, includes a self-concordant barrier function used to encode the convex set. Contrary to the simplex method, the interior point process reaches an optimal solution by traversing the interior of the feasible region. That is, the interior point process achieves optimization by going through the middle of the feasible regions defined by the problem, rather than around its surface.

According to our invention, we define $x_{k,n} = t_{k,n} c_{k,n}/B$ and $\hat{R}_k = R_k/B$. Then, we reformulate the problem in Equation (8) as in Equation (9)

$$\text{minimize} \sum_{k=1}^{K} \sum_{n=1}^{N} t_{k,n} \frac{(2^{x_{k,n}/t_{k,n}} - 1)\sigma^2}{\alpha_{k,n}^2}, \quad (9)$$

subject to, $$\sum_{n=1}^{N} x_{k,n} \geq \hat{R}_k, k = 1, 2, \ldots, K, \sum_{k=1}^{K} t_{k,n} = 1, n = 1, 2, \ldots, N, t_{k,n} \geq 0$$

for all k and n, and $x_{k,n} \geq 0$ for all k and n.

The problem in Equation (9) is a convex optimization problem with linear constraint, which can be solved efficiently with the conventional interior point process.

FIG. 3 shows the carrier allocation and transmission time sharing for multiple users by applying the OFDMA/TDMA scheme at the central controller. Through control channels, the central controller can acquire the required data rate $R_k$ 360 of each user k. The wireless channel gain factors $\alpha_{k,n}$ 330, where k=1, ..., K and n=1, ..., N can be obtained by applying channel estimation 310. Then values of $R_k$ 360 and $\alpha_{k,n}$ 330 are input into an allocation method 300. The interior point process based allocation method is then applied to solve the above optimization problem in Equation (9). The solution of $t_{k,n}$ 205 and $x_{k,n}$ (or equivalently $c_{k,n}$ 340) is obtained. Then, the solution is broadcast to all users through control channels.

Transmitter and Receiver Design

For the transceiver design for the multi-user, multi-carrier network with OFDMA/TDMA, we consider uplink and downlink communication separately. The uplink communication is for data transmission from multiple users to the central controller. The downlink communications is for the data transmission from the central controller to multiple users. The transceiver design is similar, yet still with slight difference, for the uplink and downlink respectively.

Figure 4:
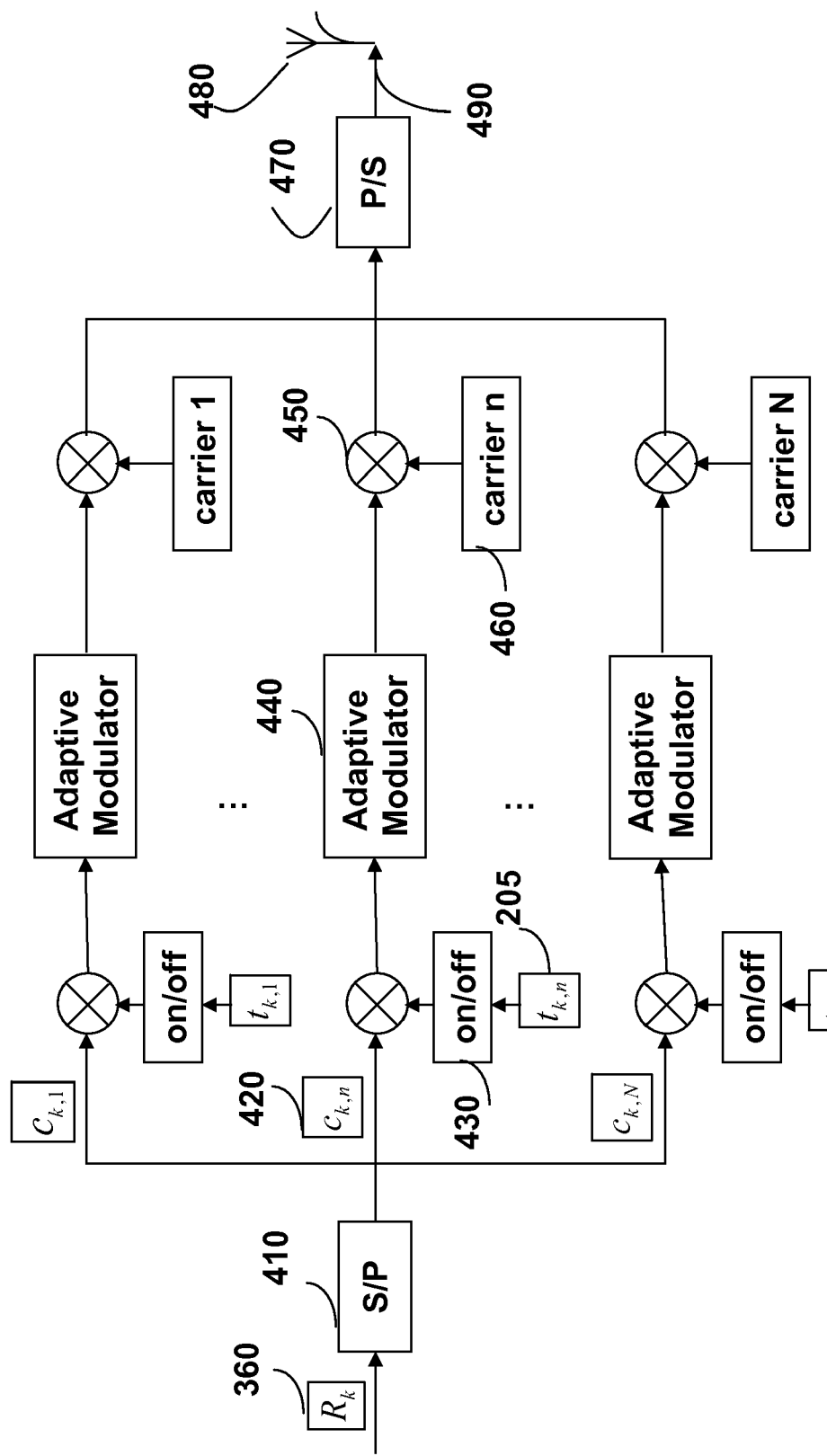
FIG. 4 is a schematic of a transmitter of user to transmit through allocated carriers and time durations to a central controller on an uplink network according to embodiments of the invention.

FIG. 4 shows the transmitter structure 400 for user k. The raw data rate of user k is $R_k$ 360. After serial-to-parallel conversion, the input data stream is partitioned into totally N sub-streams on N carriers, each with a sub-rate of $c_{k,n}$ 420. Every sub-stream then goes through an ON/OFF switch 430 controlled by the allocated transmission time interval $t_{k,n}$ 205 for carrier n of user k. Each sub-stream is then input into an adaptive modulator 440, independently. The modulator 440 modulates the data of each sub-stream adaptively according to its rate $c_{k,n}$ 420. Then, the modulated sub-streams are mixed 450 with corresponding carriers 460 and pass through a parallel-to-serial converter 470 before the data stream 490 is transmitted by antenna 480.

Figure 5:
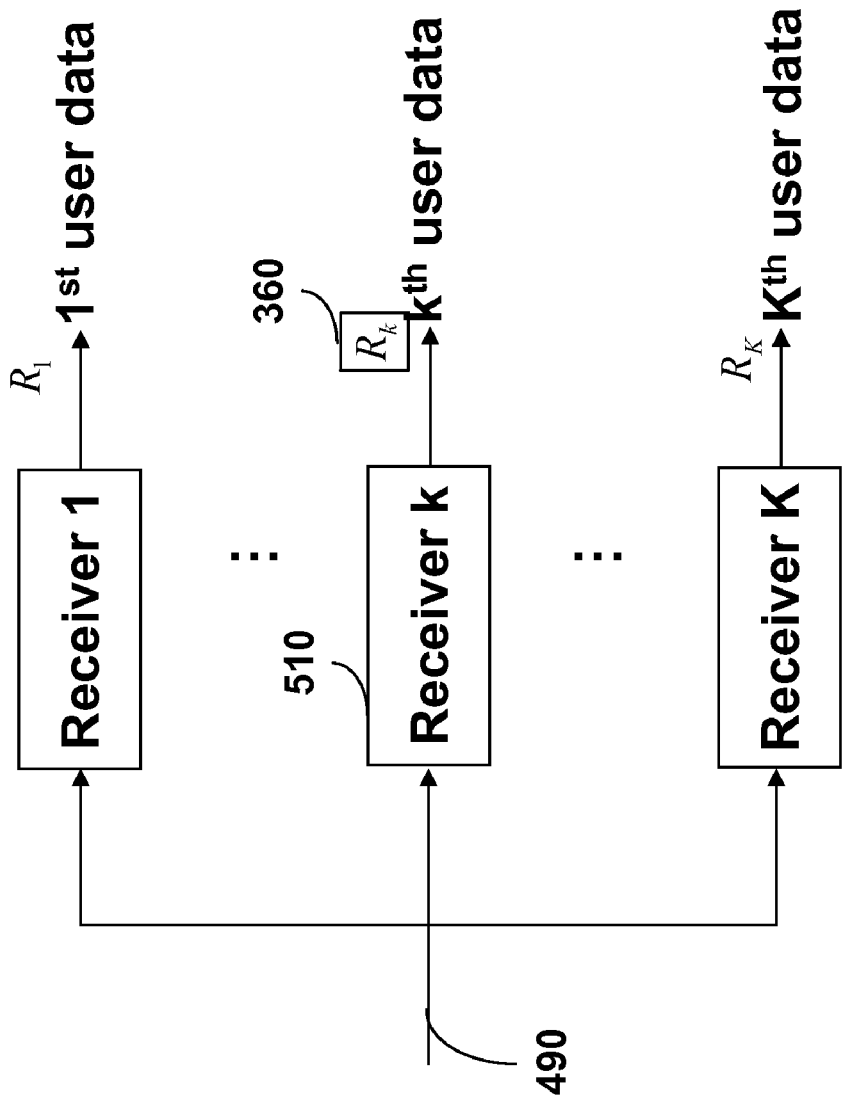
FIG. 5 is a schematic of a receiver at a the central controller for the uplink network according to embodiments of the invention.

FIG. 5 shows the receiver 500 at the central controller. The output of receiver k is the same as the input data transmitted by user k.

Figure 6:
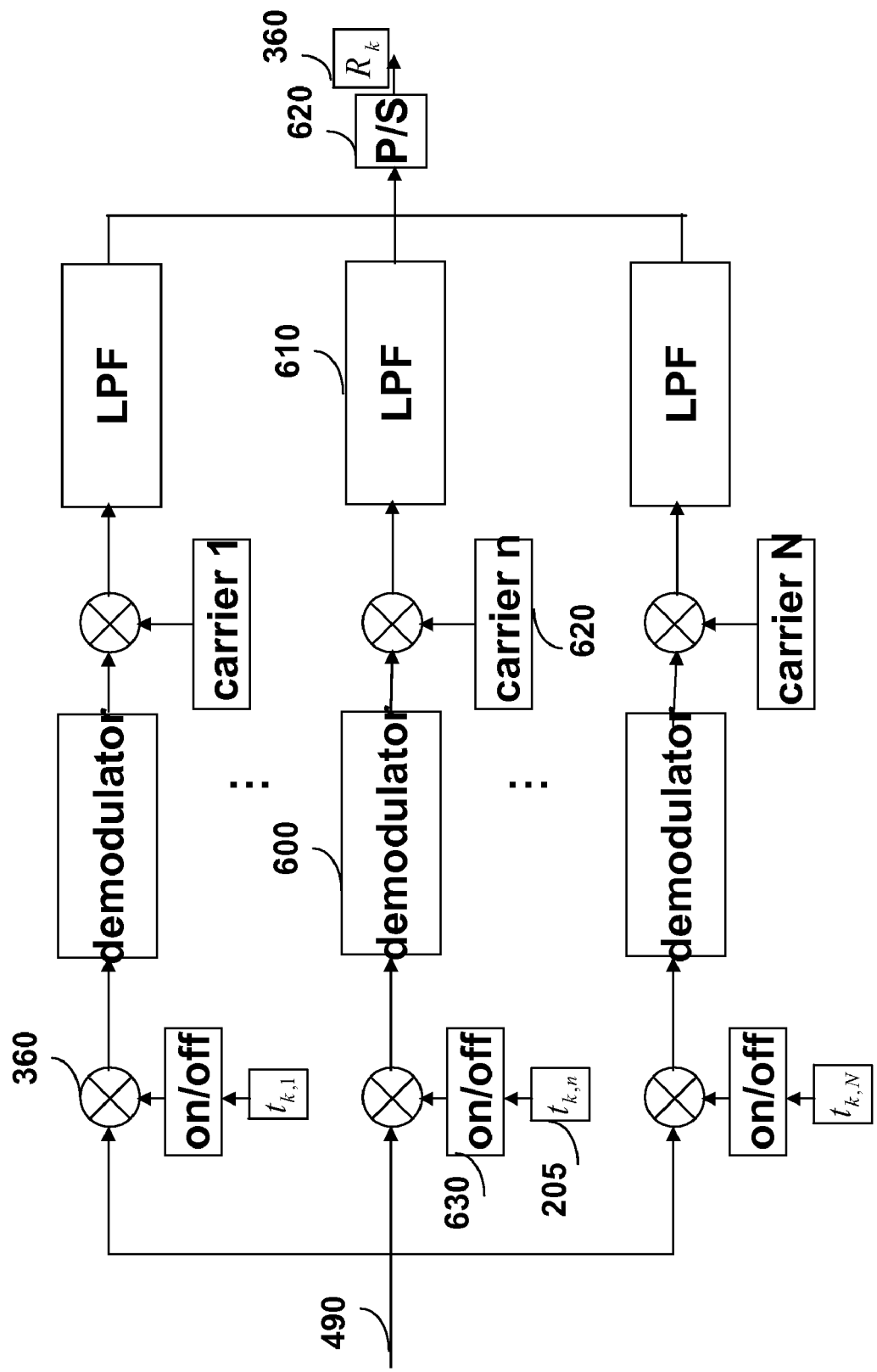
FIG. 6 is a schematic of a receiver for data of user k for the uplink and downlink network according to embodiments of the invention.

FIG. 6 shows the structure of each receiver chain k 510. The ON/OFF switch 630 controls the length of the time interval $t_{k,n}$ 205 for user k. The received signal 490 is multiplied by the output of the switch 630. Because the carrier-time allocation with OFMA/TDMA is non-overlapping among different users, only the data transmitted by user k is filtered.

After demodulation 600, the carrier is removed from the received signal by multiplying the demodulator 600 output with a corresponding carrier 620. The sub-streams on different carriers are placed into low-pass-filters (LPF) 610, respectively. The retrieved data of each carrier is exactly the input data transmitted by user k. After the parallel/serial conversion 620, the input data stream of user k with rate $R_k$ 360 is recovered.

Figure 7:
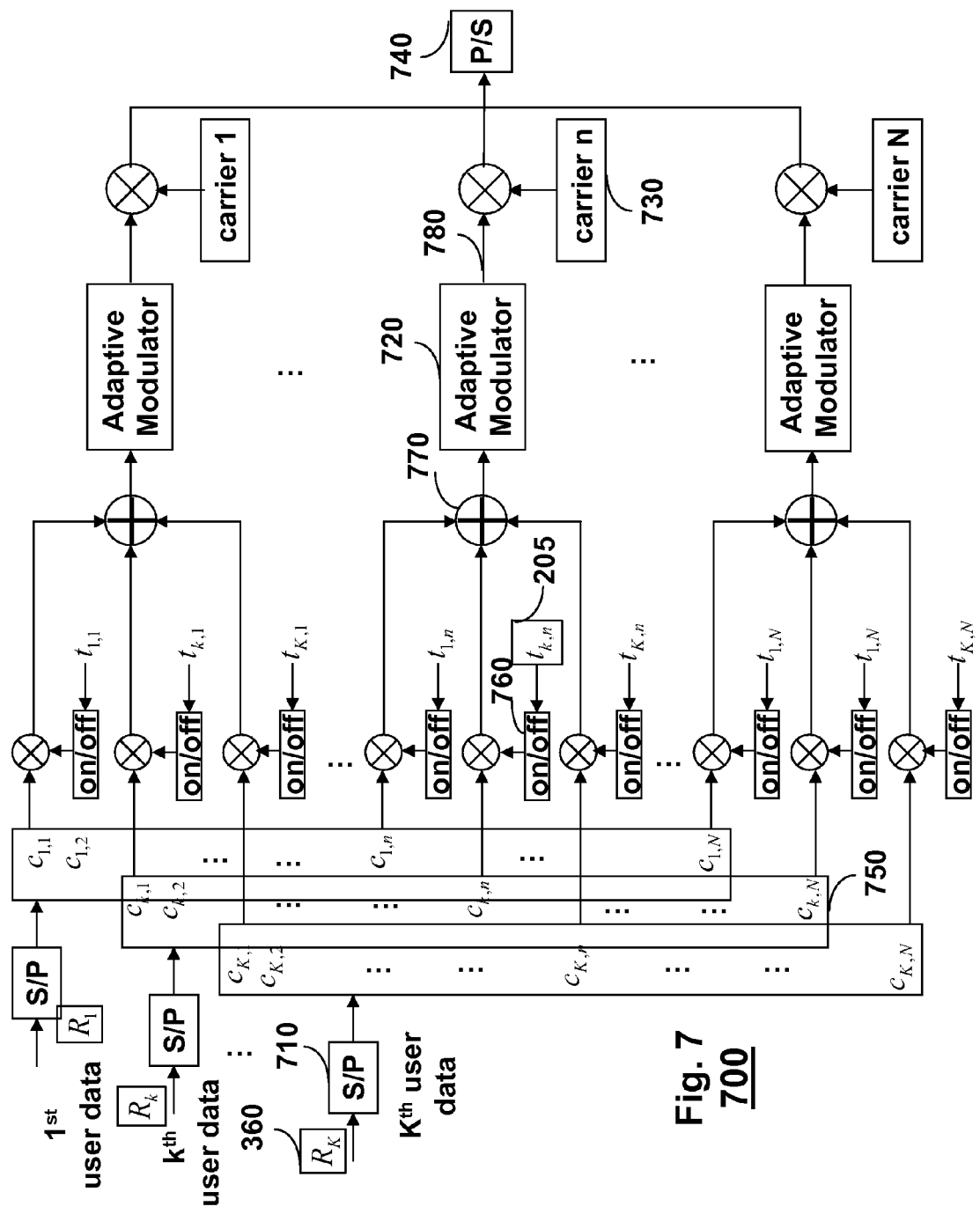
FIG. 7 is a schematic of a transmitter of the central controller to transmit to all users with OFDMA/TDMA for the downlink network according to embodiments of the invention.

FIG. 7 shows the transmitter at the central controller. The input serial data stream of each user k with rate $R_k$ 360 is converted into parallel data sub-streams $c_{k,n}$ 750, where n=1, 2, ..., N. Then, the data sub-streams $c_{k,n}$ 750 of the same n (for the same carrier n) of different user k, where k= 1, 2, ..., K, is input into the ON/OFF switch 760 controlled by the allocated time $t_{k,n}$ 205.

The data sub-streams $c_{k,n}$ for n=1, 2, ..., N are then assembled together via a summer 770 and input into an adaptive modulator 720. The modulated data 780 of each modulator is transmitted to different corresponding carriers 730 respectively. A carrier n actually carries data of different user k where k=1, 2, ..., K. The time division for multiple users is controlled by adjusting the lengths of $t_{k,n}$ 205.

The receiver structures of each user k for downlink communications are identical to the uplink receiver k as shown in FIG. 6. One difference is that, in the case of uplink communications, the receivers of different user k are all co-located assembled at the central controller, as shown in FIG. 5, while for the downlink, the receivers are distributed at each user.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for allocating resources to a set of mobile stations (MS) communicating with a base station (BS) in an orthogonal frequency-division multiple-access (OFDMA), and time-division multiple-access (TDMA) network, comprising:

optimizing a total power consumption P by the set of MSs by minimizing the power P according to $$P = \min \sum_{k=1}^{K} \sum_{n=1}^{N} t_{k,n} \frac{(2^{c_{k,n}} - 1)\sigma^2}{\alpha_{k,n}^2},$$

subject to $$\sum_{n=1}^{N} B t_{k,n} c_{k,n} \geq R_k,$$

for k=1, 2, . . . , K, where $$\sum_{k=1}^{K} t_{k,n} = 1,$$

for n=1, 2, . . . , N, $t_{k,n} \geq 0$
for all k and n, and $c_{k,n} \geq 0$ for all k and n, wherein K is a number of MS k, N is a number of frequency bands n, t is a transmission time interval for each symbol, c is a data rate in bits per symbol, $\sigma^2$ is additive white Gaussian noise (AWGN) power, $\alpha_{k,n}$ is a power gain of each channel, B is a bandwidth of each channel in Hz, $R_k$ is a guaranteed data rate in bits per second for each MS; and
    transmitting the symbols from the set of MS to the BS with power according to the optimized total power consumption.

2. The method of claim 1, wherein the set of MS transmit concurrently on the N frequency bands.

3. The method of claim 1, wherein the power gain for each MS is different and independent of the power gain of the other MS in the set.

4. The method of claim 1, wherein multiple MSs share one frequency band carrier over time.

5. The method of claim 1, further comprising:
    partitioning a transmission time of one frame of symbols into multiple symbol durations, and a particular MS occupies a particular frequency band for one or several symbol durations.

6. The method of claim 1, wherein contiguous symbol durations and frequency bands for a particular MS are a resource block, and a shape of the resource block is arbitrary a 2D time and frequency domain.

7. The method of claim 1, wherein optimizing is not a convex: and further comprising:
    converting the optimizing to be convex; and
    solving the optimizing with an interior point process.

8. The method of claim 1, further comprising:
    broadcasting a solution for the optimizing to all MS.

9. The method of claim 1, wherein the symbols for an input serial data stream to a transmitter in each MS; and further comprising:
    partitioning the data stream into multiple parallel data streams; and further comprising for each parallel data stream:
        allocating the transmission time intervals $t_{k,n}$;
        modulating adaptively the symbols;
        mixing the modulated symbols with a carrier for the frequency bands; and
        converting the mixed symbols to a serial output data stream;
    feeding the output serial data stream to an antenna.

10. The method of claim 1, further comprising:
receiving the symbols at the BS; and
demodulating the received symbols adaptively for the allocated transmission intervals.

* * * * *